United States Patent Office 3,344,884
Patented Oct. 3, 1967

3,344,884
SILENCERS FOR JET PROPULSION ENGINES OR THE LIKE
Pierre Pascal Auguste Carriere, Malakoff, Louis François Jumelle, Paris, Gaston Jean-Louis Ranvier, Issy-les-Moulineaux, and Gerhard Richter, Dammarie-les-Lys, France, assignors to Societe Nationale d'Etude et de Construction de Moteurs d'Aviation, Paris, France, and Office National d'Etudes et de Recherches Aerospatiales dit: O.N.E.R.A., Bagneux, Seine, France
Filed July 11, 1966, Ser. No. 564,300
Claims priority, application France, July 28, 1965, 26,391
6 Claims. (Cl. 181—51)

It is known to reduce the noise of jet propulsion engines of aircraft or other jet ejection devices by the use of conduit elements formed, for example, by tubes or troughs, which open into the jet to the rear of the nozzle, these elements receiving air which they introduce into the jet. The said conduit or silencer elements are advantageously retractable, that is to say means are preferably provided for withdrawing them outside the jet and for masking them behind a fixed structure, so as to reduce or eliminate their drag effect when silencing is not required.

Silencers of this type are described, more particularly, in U.S. patent applications Ser. No. 386,194, now Patent No. 3,263,931, 461,037, filed June 3, 1965, and 461,008, filed June 3, 1965. In the forms of embodiment described in the said applications means are provided for shifting the silencer elements between an operative position, in which their ends extend into the jet, and an inoperative position in which they are retracted outside the jet.

The present invention has for its object to provide improvements in silencers of this type, which will enable the depth to which the silencer elements penetrate into the jet to be adjusted.

The silencer elements, which are generally pivotally mounted, may be conduits of any form whatsoever which are capable of introducing into the jet, air picked up externally. For example, they may be constituted by hollow cylindrical or prismatic tubes which may, moreover, be cut away parallel to their generatrices to form troughs or channels, or by elements such as bells or lobes.

In the known arrangements, the silencer elements extend to a fixed distance from the axis of the jet when in the operative position. It should be observed, however, that the size of the propulsive jet to be silenced varies according to the engine load and in particular according to whether the engine is operating with or without reheat. Moreover, variations in the output of the engine, on the one hand, and variations in the elementary efficiencies of its component parts (hereinafter referred to as the "special arrangement" of the engine) have an effect on the outlet cross-section of the nozzle and therefore on the diameter of the jet opposite the silencer. Furthermore, the jet, the transverse dimension of which is variable as hereinbefore indicated, may in addition not be absolutely in the form of a body revolution about its axis. Its shape at the outlet of the silencer elements may not be absolutely symmetrical with respect to its axis, but may be, for example, slightly pinched, in particular if the secondary air is not uniformly distributed.

It would therefore be very desirable to be able to adjust the depth to which the silencer elements penetrate into the jet. To this end, the present invention provides means whereby the position of these elements may be linked with the limits of the jet to be silenced.

According to the present invention, the silencer elements are provided with surfaces which co-operate with the jet to create a lift acting in opposition to the force which tends to thrust the said elements into the jet. In the silencing position, the ends of the silencer elements are thus at a variable distance from the axis of the jet, this distance being defined at any instant by the form of the jet itself, thus enabling these elements to penetrate into the jet by a constant amount.

The improvement provided by the invention therefore makes it possible to give the silencer a constant efficiency in spite of the three causes of variation referred to above, namely the "special arrangement" of the engine which is equipped with the silencer, the engine-load and the geometrical form of the jet in space.

In one particular embodiment of the invention, each silencer element is provided with one or more aerodynamic lifting surfaces which penetrate into the jet, the equilibrium between the lift or these surfaces when exposed to the flow of the jet and the elastic forces which urge the elements towards the jet determining at every instant the correct position of the said elements with respect to the jet. Thus, for example, each element may be made in two parts which are movable one with respect to the other, one of these parts being brought into a fixed operative position by positive control means and supporting the second part by exerting on this part, which is equipped with the lifting surface or surfaces, a resilient force which thrusts it into the jet against the action of the lift.

The construction according to the invention enables the silencer elements to float, so to speak, on the jet by penetrating into it to a constant depth, so as to obtain the best compromise between the efficiency of the silencer and the loss of thrust produced by it.

The improvement provided by this invention is advantageously utilized in combination with the improvement which is described in our concurrent specification and which consists in mounting the silencer elements so that they are each able to pivot about a pivotal axis considerably offset outside the wall thereof, so as to permit wider adjustment of the distance between the ends of the said elements and the axis of the jet. The combination of these two improvements enables the automatic adjustment of the position of the silencer elements by the lifting surface or surfaces to be effected within wide limits.

The description which follows with reference to the accompanying drawings, which is given by way of non-limitative example, will enable the various features of the invention and the manner of carrying them into effect to be clearly understood, any arrangement appearing both from the text and from the drawings naturally falling within the scope of the said invention as defined by the appended claims. In the drawings:

Figure 1:
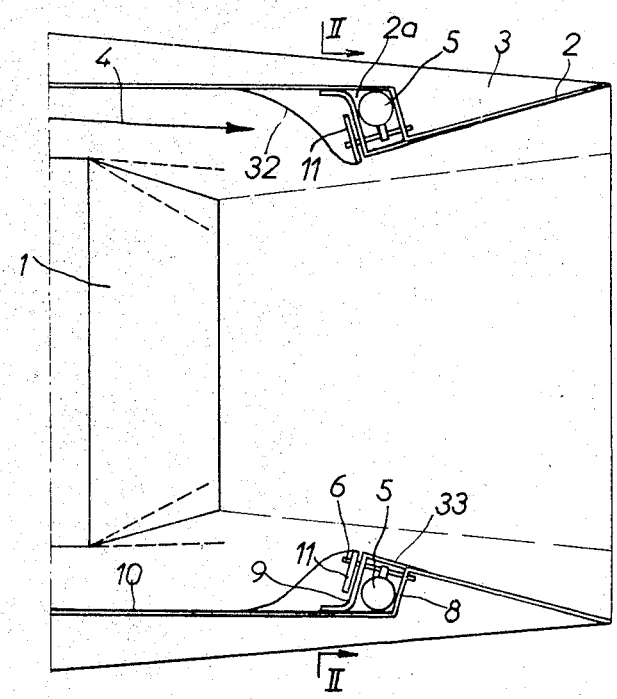
FIGURE 1 is a longitudinal sectional view of the end of a nozzle and its silencer according to one embodiment of the invention.
Figure 2:
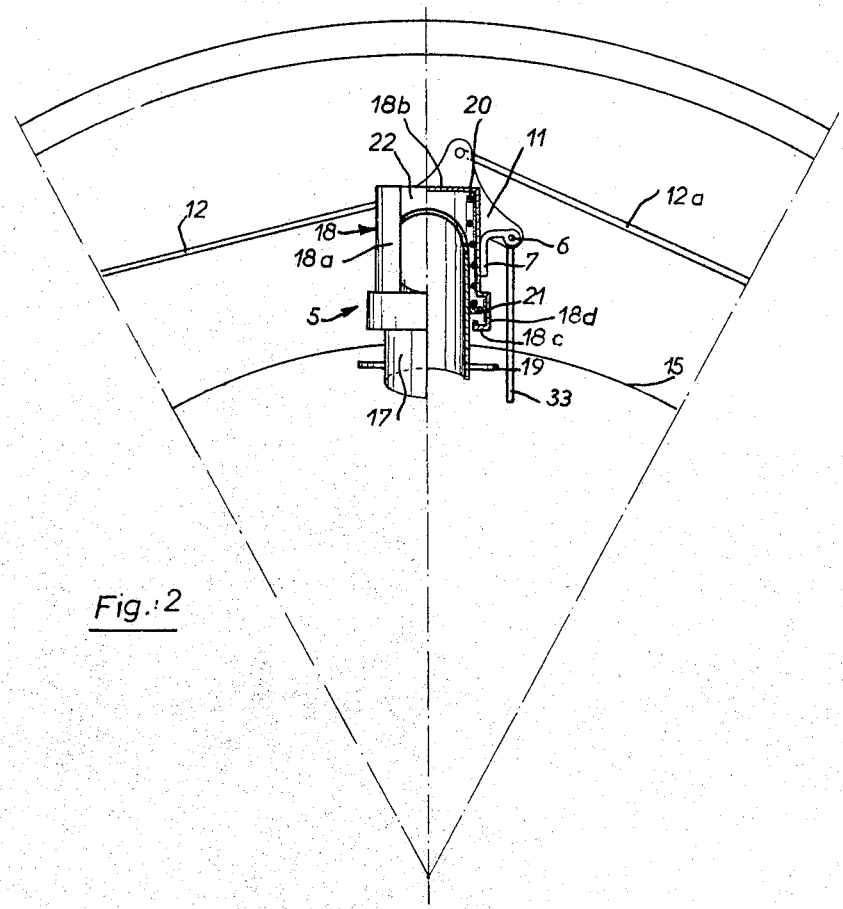
FIGURE 2 is a partial sectional view on the line II—II of FIGURE 1, on a larger scale, the silencer element being partly in elevation.

Referring to the drawings, FIGURES 1 and 2 show a silencer similar to that which is shown in said application Ser. No. 461,037. A convergent primary nozzle 1, rigid with the engine (not shown), can be seen. The divergent portion or element 2, which follows the nozzle, forms part of the structure 3 of the aircraft. In the annular space between the nozzle 1 and the structure 3 there occurs a secondary air flow 4. Tube elements 5 forming the silencer are distributed round the divergent elements 2, at the upstream end thereof, in a recess provided for this purpose. They pivot about spindles 6 mounted between the front face 8 of the divergent element and a conical ring 9 welded to the inner wall 10 of the structure 3. On the upstream side, the elements 5 are bevelled, or cut in the form of whistles, in order to facilitate the entry of secondary air 4. Rocking levers or "puppets" 11 enable the tubes to be pivoted about their spindles 6. Each of these "puppets" is linked to its neighbours by connecting rods 12, 12a. A single control means (not shown), for example a jack, permits simultaneous adjustment of all the tubes.

The assembly composed of these elements and their control means is housed in an annular fairing 32 which is suitably profiled and provided with openings permitting the passage of the elements into the positions which they occupy when the silencer is operative. In the inoperative positions, the openings are closed by flaps 33 fast with the elements themselves, which provide continuity of the surface of the fairing 32.

The silencer elements are shown in the inoperative position in FIGURE 1 and one of these elements can be seen in the operative position in FIGURE 2.

It will be seen in FIGURE 2 that, in accordance with the said concurrent specification, each element 5 is mounted on its spindle 6 by means of a right-angled member 7 fast with the element 5 and this enables the axis defined by the spindle 6 to be offset to a very substantial extent outside the element 5. The "puppet" 11 is fast with the right-angled member 7, so that when it is actuated by the connecting rods 12, 12a it pivots about the axis 6 and carries the right-angled member 7 and the element 5 with it.

Figure 3:
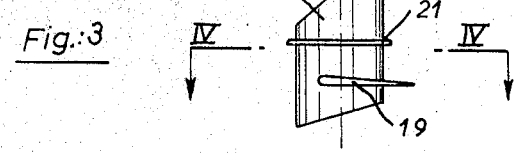
FIGURE 3 is an elevational view of that part of this element which is in contact with the jet.
Figure 4:
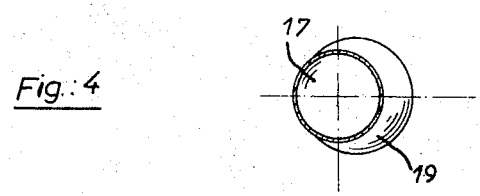
FIGURE 4 is a sectional view on the line IV—IV of FIGURE 3.

As will be seen in particular in FIGURES 2 to 4, the silencer elements 5 are conduit elements formed of two parts 17 and 18. The part 17, which is shown in greater detail in FIGURES 3 and 4, is a tube element the end of which is bevelled or cut in the form of a whistle, as hereinbefore indicated, and which is equipped externally in the vicinity of its downstream end with a vane or fin 19 forming an aerodynamic lifting surface in accordance with the invention. This vane 19 has an angle of incidence or attack, an area and a contour such that when the part 17 penetrates into the jet by an amount which gives the optimum compromise between muffling of the noise and loss due to the silencer, the lift resulting from the flow of the jet over the said vane 19 balances a centripetal resilient force which tends to thrust the part 17 into the jet. In the particular embodiment described, this resilient force is that of a spring 20 bearing on the part 18.

The said part 18 is constituted by a hollow cylinder 18a provided at one end with a base 18b and at the other end with a cylindrical widened portion 18d terminating in a reentrant rim 18c. The part 17 is variable in position in the part 18 and, for this purpose, it comprises a collar 21 which slides with slight friction in the enlarged portion 18d and on which there bears one end of the spring 20, the other end of which bears against the base 18d. Sliding engagement of the tube 17 in the part 18 and mutual centering of these two parts are thus ensured by the collar 21 and the rim 18c. The part 18 is pivotally mounted on a spindle 6 by means of the right-angled member 7 which is fast with the "puppet" 11, as hereinbefore stated. The connecting rods 12 and 12a enable the assembly to be pivoted between the inoperative position 16b of the silencer elements (FIGURE 1) and the operative position shown in FIGURE 2, in which the tubes 17 are oriented in a substantially radial direction. The parts 18 have wide apertures at the front, at 22, to permit the air flowing around the nozzle to enter through the bevelled opening in the tubes 17. This air is discharged into the jet by the tubes 17, to produce the reduction of the noise.

It will be understood that when the parts 18 are located in the silencing position shown in FIGURE 2, the tubes 17 are urged in the opposite direction by the springs 20, and by the lift of the vanes 19 and slide in the parts 18, so as to remain always in one and the same position with respect to the edge or limit 15 of the jet, whatever the temporary variations of the latter, the jet thus being followed, practically speaking, without any attenuation or dephasing. Moreover, each silencer element possesses such an independent follower device, so that the peripheral irregularities of the jet are automatically absorbed.

Figure 5:
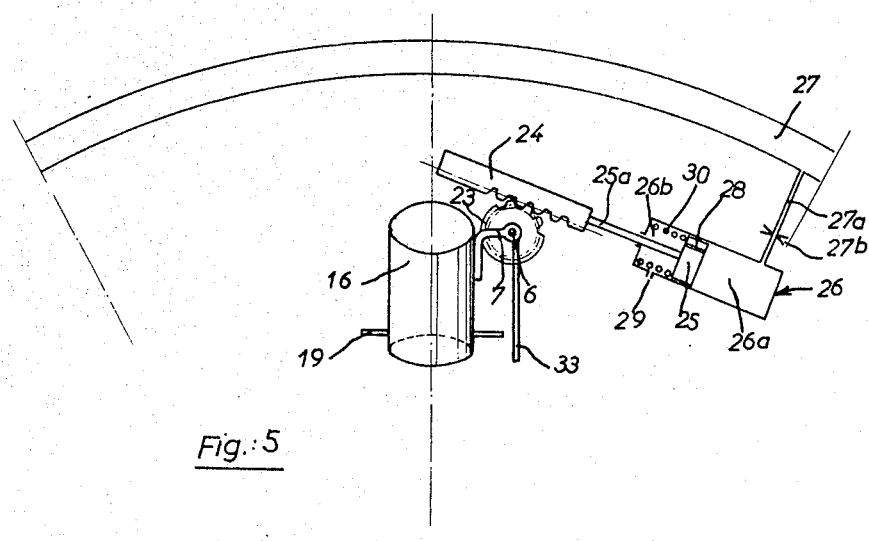
FIGURE 5 is a view similar to FIGURE 2 but showing an alternative embodiment and FIGURE 6 is a fragmentary view corresponding to FIGURE 5 but showing a modified constructional form.
Figure 6:
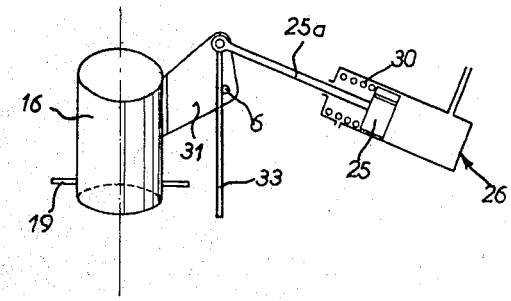

It is obvious that the force which tends to thrust the tubes into the jet in opposition to the lift of the vanes 19 may be obtained by other means. FIGURES 5 and 6 show that it is possible to utilize for this purpose, for example, the force of jacks individually controlling the rocking of the silencer elements between their operative position and their inoperative position.

In the modifications shown in FIGURES 5 and 6, the silencer elements are in one piece and are not controlled by the previously described general arrangement (puppets 11, connecting rods 12 and a single jack), but by individual jacks, in which the chamber which is situated on the appropriate side of the piston is supplied with compressed air, the said chamber being provided with a dimensioned air outlet, so that in the operative position the force exerted on the piston balances the lift of the vane when the latter is in the position giving the optimum compromise between the muffling of the noise and the losses due to the silencer.

In FIGURE 5, the silencer elements are constituted by simple tubes 16 each provided with a vane 19, like the tubes 17 in FIGURE 3. Each tube 16 is pivotally mounted on a spindle 6 by means of a right-angled member 7 fast with a pinion 23 meshing with a rack 24 which is itself fast with the rod 25a of the piston 25 of a jack 26. All the jacks 26 associated with the various silencer elements 16 are supplied with compressed air or gas at a pressure which is constant or which is related, in accordance with a given law, to the pressure in the nozzle duct; the jacks 26 are supplied by way of a peripheral manifold 27 connected to a suitable source of compressed gas. It will be seen in FIGURE 5 that the compressed gas in the manifold 27 passes into the chamber 26a of the jack 26 through a conduit 27a having a constriction 27b. The air under pressure in the chamber 26a passes through a hole 28 in the piston 25 into the chamber 26b and escapes to the exterior through a hole 29. This air under pressure in the chamber 26a, acting in opposition to the action of a spring 30, pushes the piston 25 and thus the rack 24, and the latter, through the medium of the pinion 23, causes the tube 16 to pivot about its spindle 6 from the inoperative position into the operative position. In this latter position it is the force of the jack 26 which tends to thrust the tube 16 into the jet in opposition to the lift of the vane 19.

In the embodiment shown in FIGURE 6, the tube 16 equipped with the vane 19 is fast with a "puppet" 31 which is pivotally mounted on the spindle 6 and actuated directly by the piston rod 25a of the jack 26.

In the embodiments shown in FIGURES 5 and 6, the tube 16, when in the silencing position, will adopt a position of equilibrium such that the constant or variable force due to the pressure of the air in the jack 26, which urges the tube to turn about the spindle 6 in a counterclockwise direction, is equal to the lifting force due to the vane 19, which tends to cause the tube to turn about the same axis in the other direction, this latter force varying in accordance with the penetration of the tube into the jet.

In order to retract the tubes 16 when the silencer effect is no longer desired, it is sufficient to remove the pressure from the manifold 27, so that the springs 30 repel the pistons 25, thus causing the tubes 16 to pivot in the clockwise direction.

What we claim is:
1. A silencer device for a jet, including a plurality of elements each having a portion adapted to penetrate into a jet emitted by a nozzle, in order to reduce noise due to the jet, and further comprising thrust means for applying to each element a force tending to thrust it into the jet and, for each said element, at least one aerodynamic lift member connected thereto and adapted to co-operate with the jet to apply to said element a thrust acting in opposition to the said force, so that said portion penetrates into the jet to a substantially constant extent.

2. A device according to claim 1, in which the elements comprises a plurality of conduits distributed around the jet and each having an inlet end which is subjected to the ambient pressure adjacent the outer periphery of the nozzle, and an outlet end on said portion, which is adapted to penetrate into the jet at a point spaced a substantial distance downstream of the nozzle, said device further comprising a plurality of supports, each conduit being slidably mounted in one of the said supports, means for displacing the supports towards an inoperative position in which the supports and the conduits are completely retracted out of the jet, the thrust means comprising resilient elements provided in each support to exert the said force on the conduit mounted in the respective support and lift members each having at least one lifting surface rigid with the said portion of each conduit which is adapted to penetrate into the jet.

3. A device according to claim 1, in which the thrust means comprise fluid-pressure operated means to apply the said force to the respective elements.

4. A silencer device for a jet, having at least one inoperative position and at least one operative position in which it is effective to reduce the noise of a jet emitted by a nozzle, the device comprising a plurality of elements each having a portion which is adapted to penetrate into the jet in the said operative position and to be retracted in the said inoperative position, a plurality of fluid pressure jacks each adapted to displace one of the said elements between the said inoperative position in which said one element is completely retracted and the operative position, in which such jack exerts on the said one element a force adapted to thrust it into the jet, and lift members connected to said respective elements and adapted to co-operate with the jet in the said operative position, to apply to said elements a thrust in the direction opposite the said force, so that the said portion penetrates into the jet by a predetermined amount.

5. A device according to claim 4, wherein each jack has a fluid pressure chamber having an orifice providing a fluid leak therefrom, said device further comprising a source of fluid under pressure, a collector communicating with said source and a plurality of tubes each connecting the collector to said pressure chamber of one of said jacks, a constriction being provided in each tube and said contrictions and orifices being so dimensioned that, for each said element, equilibrium between the said force and the said opposite thrust acting on said element ensures penetration of said portion of said element into the jet by a predetermined amount.

6. A silencer device for a jet, having at least one inoperative position and at least one operative position for reducing the noise of a jet emitted by a nozzle, comprising:

(a) a plurality of conduits distributed around the jet and each having an inlet end which is subjected, at least in the operative position, to the ambient pressure adjacent the outer periphery of the nozzle, and an outlet end which, in the operative position, is adapted to penetrate into the jet at a zone of the latter of lower pressure than said ambient pressure, each conduit being mounted to pivot about an axis extending in a general direction substantially longitudinal relatively to the jet and considerably offset toward the exterior of such conduit;

(b) means adapted to displace the conduits between the inoperative position, in which the conduits are completely retracted out of the jet, and the operative position, and to apply to each conduit, in the said operative position, a force which causes it to be thrust into the jet; and (c) lift members connected to each conduit and adapted to co-operate with the jet, to apply to each conduit a thrust in a direction opposite to the said force, in order that the end of each conduit shall penetrate into the jet to a substantially constant extent.

References Cited
UNITED STATES PATENTS

| | | | |
|---|---|---|---|
| 2,886,946 | 5/1959 | Parker | 181—33 |
| 2,997,845 | 8/1961 | Oulianoff | 181—33 |
| 3,027,714 | 4/1962 | Parker | 181—33 |
| 3,263,931 | 8/1966 | Bartek et al. | 181—33 |

RICHARD B. WILKINSON, *Primary Examiner.*
R. S. WARD, *Examiner.*